(12) United States Patent
Kobashi

(10) Patent No.: US 12,456,410 B2
(45) Date of Patent: Oct. 28, 2025

(54) DISPLAY DEVICE

(71) Applicant: Japan Display Inc., Tokyo (JP)

(72) Inventor: Junji Kobashi, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 18/808,700

(22) Filed: Aug. 19, 2024

(65) Prior Publication Data

US 2025/0078716 A1 Mar. 6, 2025

(30) Foreign Application Priority Data

Sep. 1, 2023 (JP) ................... 2023-142538

(51) Int. Cl.
*G09G 3/20* (2006.01)
*G02F 1/1334* (2006.01)
*G02F 1/1335* (2006.01)
*G02F 1/13357* (2006.01)
*G09G 3/36* (2006.01)

(52) U.S. Cl.
CPC ....... *G09G 3/2077* (2013.01); *G02F 1/13345* (2021.01); *G02F 1/133553* (2013.01); *G02F 1/133615* (2013.01); *G09G 3/3648* (2013.01); *G09G 2320/0233* (2013.01)

(58) Field of Classification Search
CPC ........... G02F 1/13345; G02F 1/133553; G02F 1/133615; G09G 2320/0233; G09G 3/2077; G09G 3/3648; G02B 6/0013; G02B 6/0038; G02B 6/0031
See application file for complete search history.

(56) References Cited

U.S. PATENT DOCUMENTS

| 2013/0083260 A1* | 4/2013 | Minami | G02B 6/0038 349/64 |
| 2019/0064559 A1* | 2/2019 | Harada | G02B 6/0013 |
| 2022/0004052 A1 | 1/2022 | Ohue | |

FOREIGN PATENT DOCUMENTS

| JP | 2010-230835 A | 10/2010 | |
| JP | 2020-160254 A | 10/2020 | |
| KR | 20120036527 A * | 4/2012 | ........... G09G 3/3648 |
| KR | 20180007041 A * | 1/2018 | ........... G02B 6/0031 |

* cited by examiner

*Primary Examiner* — Richard J Hong
(74) *Attorney, Agent, or Firm* — K&L Gates LLP

(57) ABSTRACT

A display device includes: a display panel having a display area overlapping pixels; a light source device located on a lateral side of the display panel and configured to emit first light to a first side surface side of the display panel to cause the first light to travel toward a second side surface side; a reflective member located on the second side surface and configured to reflect the first light as second light from the second side surface side toward the first side surface side; and a drive circuit configured to calculate an output gradation value for each pixel based on a light quantity obtained by summing a first light quantity of the first light and a second light quantity of the second light at the pixel and an input gradation value of an image signal and apply a voltage corresponding to the output gradation value to the pixel.

6 Claims, 10 Drawing Sheets

DISPLAY DEVICE

CROSS-REFERENCE TO RELATED APPLICATION

This application claims the benefit of priority from Japanese Patent Application No. 2023-142538 filed on Sep. 1, 2023, the entire contents of which are incorporated herein by reference.

BACKGROUND

1. Technical Field

What is disclosed herein relates to a display device.

2. Description of the Related Art

Japanese Patent Application Laid-open Publication No. 2020-160254 (JP-A-2020-160254) discloses a display device configured to allow a background on one plate surface side of a display panel to be viewed from the other plate surface thereof. The display device of JP-A-2020-160254 is what is called a see-through display, which includes a display panel including a liquid crystal layer containing polymer-dispersed liquid crystals, and a light source located so as to face a side surface of the display panel.

Japanese Patent Application Laid-open Publication No. 2010-230835 (JP-A-2010-230835) discloses a reflective liquid crystal display device that includes a liquid crystal panel, a light source located on an end surface side of the liquid crystal panel, and a side reflective plate located opposite the light source with the liquid crystal panel interposed therebetween.

In the display device of JP-A-2020-160254, light (first light) from the light source (light source device) enters the display panel from a first side surface thereof and propagates in the display panel toward a second side surface opposite the first side surface. The display panel is provided with elements such as switching elements and electrodes, and these elements consume part of the first light propagating in the display panel. As a result, the light quantity of the first light decreases as the first light propagates in the display panel. Consequently, the light quantity of the first light on the second side surface side becomes lower than the light quantity of the first light on the first side surface side in the display panel. In this case, when gradation values corresponding to a plurality of pixels are equal to one another, the luminance of the pixels on the second side surface side becomes lower than that of the pixels on the first side surface side.

Therefore, it is conceivable to provide the side reflective plate disclosed in JP-A-2010-230835 on the second side surface side of the display panel. In this case, the side reflective plate reflects the first light from the second side surface side toward the first side surface side. The second light reflected by the side reflective plate propagates in the display panel, thereby increasing the light quantity in the display panel.

However, part of the second light reflected by the side reflective plate is also consumed as it propagates in the display panel. Therefore, regarding the light quantity in the display panel obtained by combining the first light with the second light, the light quantity at an intermediate area between an area on the first side surface side and an area on the second side surface side is lower than the light quantity at the area on the first side surface side and the light quantity at the area on the second side surface side. In this case, when the gradation values corresponding to the pixels are equal to one another, desired luminance of the pixels may not be obtained at the intermediate area.

For the foregoing reasons, there is a need for a display device that includes a display panel on which light is incident from two side surfaces thereof located opposite to each other and is capable of uniformizing the luminance of a plurality of pixels when input gradation values corresponding to the pixels are equal to one another.

SUMMARY

According to an aspect, a display device includes: a display panel having a display area overlapping a plurality of pixels arranged in a matrix having a row-column configuration in plan view; a light source device that is located on a lateral side of the display panel and is configured to emit first light to a first side surface side of the display panel to cause the first light to travel toward a second side surface side opposite the first side surface; a reflective member that is located on the second side surface and configured to reflect the first light as second light from the second side surface side toward the first side surface side; and a drive circuit configured to calculate an output gradation value for each of the pixels based on a light quantity obtained by summing a first light quantity of the first light and a second light quantity of the second light at the pixel and an input gradation value contained in an image signal, and apply a voltage corresponding to the output gradation value to the pixel.

According to an aspect, a display device includes: a display panel having a display area overlapping a plurality of pixels arranged in a matrix having a row-column configuration in plan view; a light source device that is located on a lateral side of the display panel and is configured to emit first light to a first side surface side of the display panel to cause the first light to travel toward a second side surface side opposite the first side surface; a reflective member that is located on the second side surface side of the display panel and configured to reflect the first light toward the first side surface side; and a drive circuit configured to calculate an output gradation value for each of the pixels based on an input gradation value contained in an image signal, and apply a voltage corresponding to the output gradation value to the pixel. The drive circuit is configured to, when the input gradation values corresponding to the pixels are equal to one another, increase and then reduce the output gradation values corresponding to the pixels arranged from the first side surface toward the second side surface along a first direction.

According to an aspect, a display device includes: a display panel having a display area overlapping a plurality of pixels arranged in a matrix having a row-column configuration in plan view; a light source device that is located on a lateral side of the display panel and is configured to emit first light to a first side surface side of the display panel to cause the first light to travel toward a second side surface side opposite the first side surface; a second light source device that is located on a lateral side of the display panel and is configured to emit third light to the second side surface side to cause the third light to travel toward the first side surface side; and a drive circuit configured to calculate an output gradation value for each of the pixels based on a light quantity obtained by summing a first light quantity of the first light and a third light quantity of the third light at the pixel and an input gradation value contained in an image signal, and apply a voltage corresponding to the output gradation value to the pixel.

DETAILED DESCRIPTION

Figure 1:
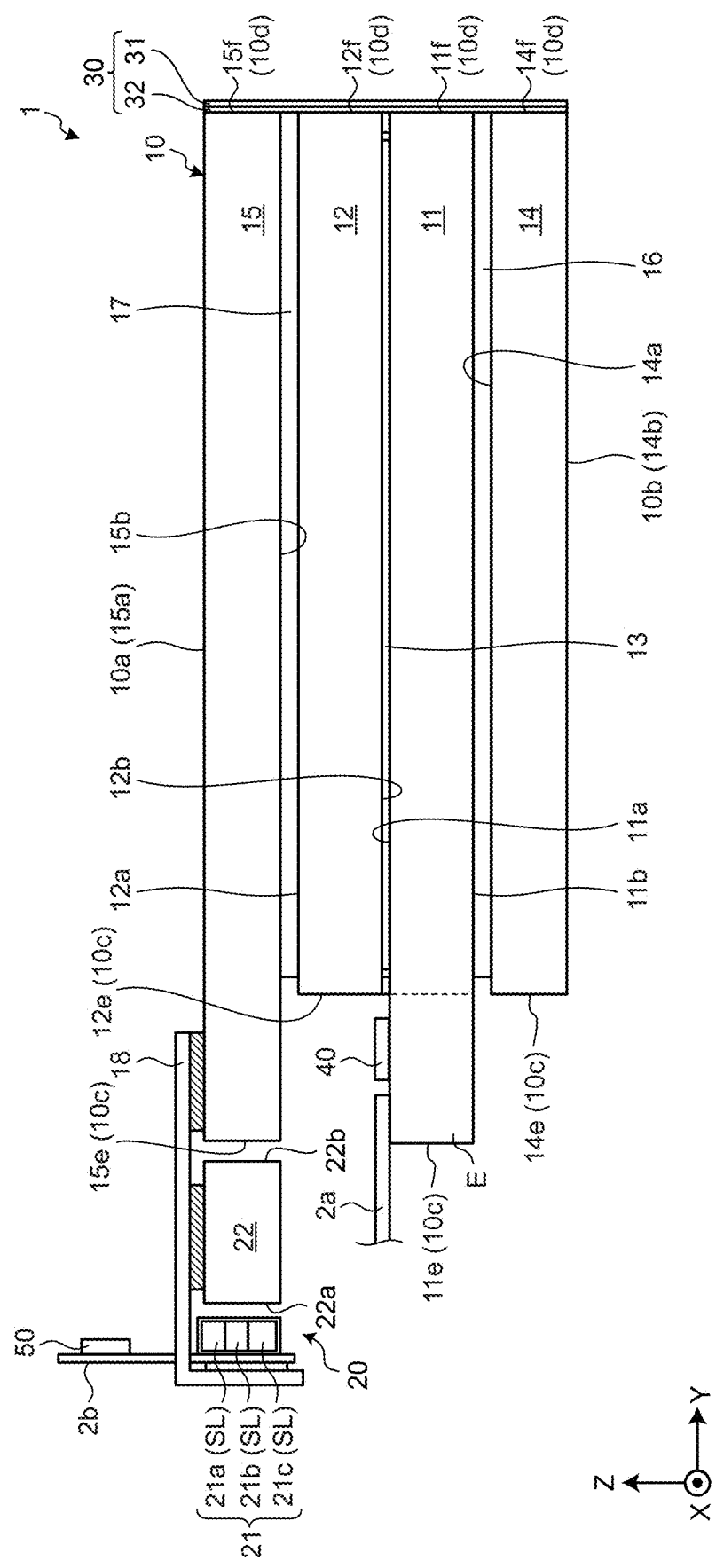
FIG. 1 is a view illustrating a configuration of a display device according to a first embodiment of the present disclosure.

The following describes embodiments of the present disclosure with reference to the drawings. The present disclosure is not limited to the description of the embodiments given below. Components described below include those easily conceivable by those skilled in the art or those substantially identical thereto. In addition, the components described below can be combined as appropriate.

What is disclosed herein is merely an example, and the present disclosure naturally encompasses appropriate modifications easily conceivable by those skilled in the art while maintaining the gist of the present disclosure. To further clarify the description, the drawings schematically illustrate, for example, widths, thicknesses, and shapes of various parts as compared with actual aspects thereof, in some cases. However, they are merely examples, and interpretation of the present disclosure is not limited thereto. The same element as that illustrated in a drawing that has already been discussed is denoted by the same reference numeral through the description and the drawings, and detailed description thereof will not be repeated in some cases where appropriate.

An X direction and a Y direction illustrated in the drawings correspond to directions parallel to a plate surface of a substrate included in a display device 1. A +X side and a −X side in the X direction and a +Y side and a −Y side in the Y direction correspond to lateral sides of the display device 1. A Z direction corresponds to a thickness direction of the display device 1. A +Z side in the Z direction corresponds to a front side on which images are displayed in the display device 1, and a −Z side in the Z direction corresponds to a back side of the display device 1. In this specification, "plan view" refers to viewing the display device 1 from the +Z side toward the −Z side along the Z direction. The Y direction corresponds to a first direction W1. The X, Y, and Z directions are examples, and the present disclosure is not limited to these directions.

First Embodiment

Figure 2:
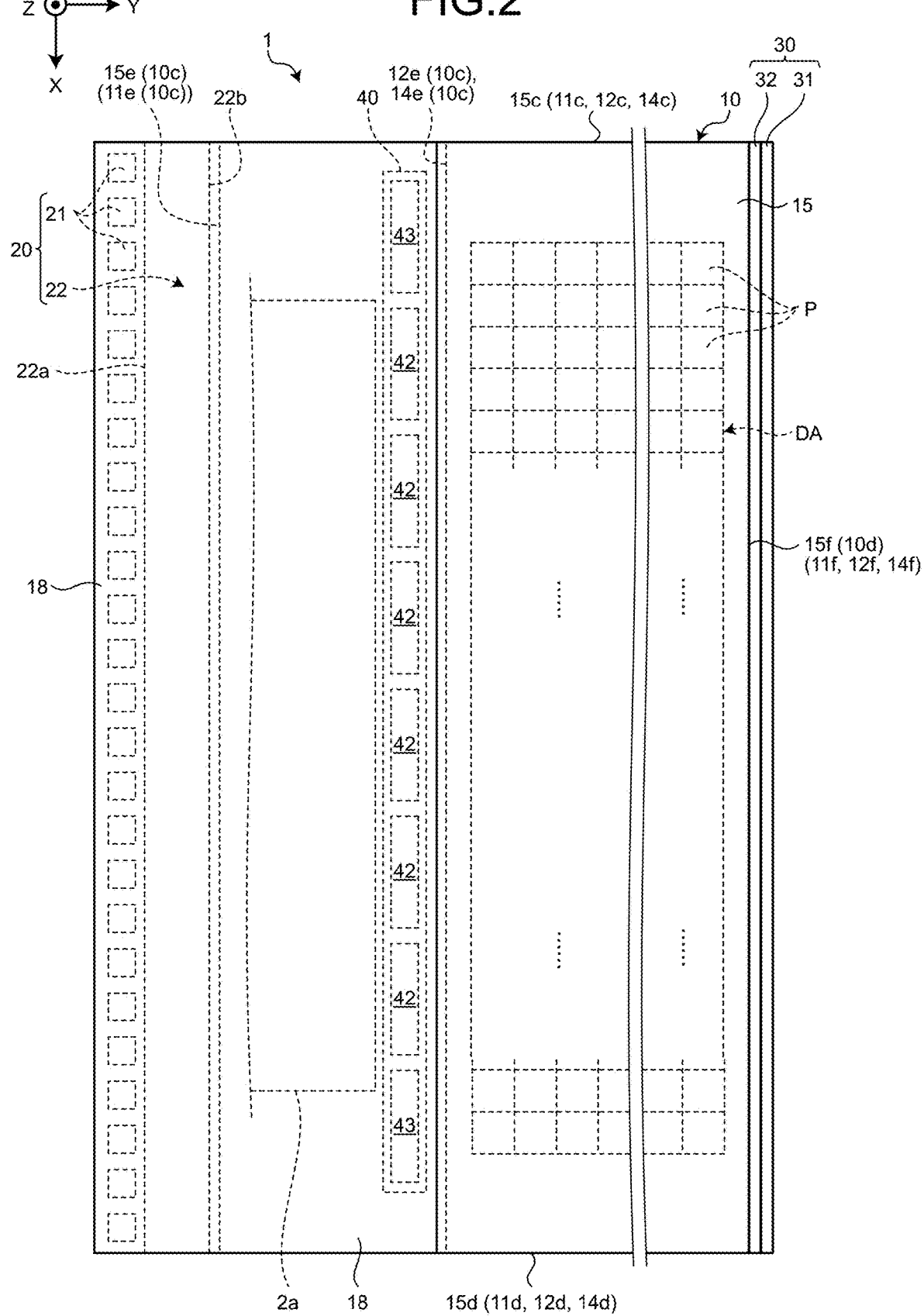
FIG. 2 is a plan view of the display device.

FIG. 1 is a view illustrating a configuration of the display device 1 according to a first embodiment of the present disclosure. FIG. 2 is a plan view of the display device 1. The display device 1 displays the images based on image signals output from an external device (not illustrated) electrically coupled through a first flexible wiring substrate 2a. The display device 1 includes a display panel 10, a light source device 20, a reflective member 30, a first drive circuit 40 (corresponding to a "drive circuit"), and a second drive circuit 50.

The display panel 10 is what is called a see-through display (transparent display). In the display panel 10, a background on one plate surface side (for example, a back surface 10b side) of the display panel 10 is visible from the other plate surface side (for example, a front surface 10a side) of the display panel 10. The display panel 10 has a display area DA in which the images are displayed on the plate surface (front surface 10a). The display panel 10 includes a first substrate 11, a second substrate 12, a liquid crystal layer 13, a first base member 14, and a second base member 15.

The first substrate 11 and the second substrate 12 are rectangular in plan view and have a light-transmitting property. The first substrate 11 and the second substrate 12 are made of a resin, such as polyethylene terephthalate, or glass. The first substrate 11 has an exposed portion E that is exposed from the second substrate 12 in plan view. The first substrate 11 is located on a back surface 12b side of the second substrate 12. A front surface 11a of the first substrate 11 and the back surface 12b of the second substrate 12 face each other. The liquid crystal layer 13 is disposed between the first substrate 11 and the second substrate 12.

As illustrated in FIG. 2, the display area DA overlaps a plurality of pixels P arranged in a matrix having a row-column configuration along the X and Y directions in plan view. Each of the pixels P is square in plan view. Details of the liquid crystal layer 13 and the pixel P will be described later.

The first base member 14 and the second base member 15 illustrated in FIGS. 1 and 2 protect the first substrate 11, the second substrate 12, and the liquid crystal layer 13. The first base member 14 and the second base member 15 are rectangular in plan view and have a light-transmitting property. The first base member 14 and the second base member 15 are made of glass or resin, for example. The first base member 14 is bonded to a back surface 11b of the first substrate 11 with a first adhesive portion 16 interposed therebetween. The second base member 15 is bonded to a front surface 12a of the second substrate 12 with a second adhesive portion 17 interposed therebetween. The first adhesive portion 16 and the second adhesive portion 17 have a light-transmitting property and are formed by curing an adhesive.

The front surface 11a and the back surface 11b of the first substrate 11, the front surface 12a and the back surface 12b of the second substrate 12, a front surface 14a and a back surface 14b of the first base member 14, and a front surface 15a and a back surface 15b of the second base member 15 are flat surfaces and parallel to one another. The front surface 15a of the second base member 15 corresponds to the front surface 10a of the display panel 10, and the back surface 14b of the first base member 14 corresponds to the back surface 10b of the display panel 10.

A first XL side surface 11c, a second XL side surface 12c, a third XL side surface 14c, and a fourth XL side surface 15c serving as −X side surfaces of the first substrate 11, the second substrate 12, the first base member 14, and the second base member 15, respectively, are flat surfaces and parallel to one another. Furthermore, a first XR side surface 11d, a second XR side surface 12d, a third XR side surface 14d, and a fourth XR side surface 15d serving as +X side surfaces of the first substrate 11, the second substrate 12, the first base member 14, and the second base member 15, respectively, are flat surfaces and parallel to one another.

In addition, a first YB side surface 11e, a second YB side surface 12e, a third YB side surface 14e, and a fourth YB side surface 15e serving as −Y side surfaces of the first substrate 11, the second substrate 12, the first base member 14, and the second base member 15, respectively, are flat surfaces and parallel to one another. The first YB side surface 11e, the second YB side surface 12e, the third YB side surface 14e, and the fourth YB side surface 15e correspond to a first side surface 10c of the display panel 10.

Furthermore, a first YF side surface 11f, a second YF side surface 12f, a third YF side surface 14f, and a fourth YF side surface 15f serving as +Y side surfaces of the first substrate 11, the second substrate 12, the first base member 14, and the second base member 15, respectively, are flat surfaces and parallel to one another. The first YF side surface 11f, the second YF side surface 12f, the third YF side surface 14f, and the fourth YF side surface 15f correspond to a second side surface 10d of the display panel 10.

The light source device 20 is located on a lateral side of the display panel 10. Specifically, the light source device 20 is located on the first side surface 10c side of the display panel 10, and faces the fourth YB side surface 15e of the second base member 15. The light source device 20 emits light to the first side surface 10c side of the display panel 10 to cause the light to travel toward the second side surface 10d side opposite the first side surface 10c (details will be described later). The light source device 20 is fixed to the second base member 15 with a support 18 interposed therebetween. The light source device 20 includes a light emitter 21 and a light guide 22.

A plurality of the light emitters 21 are provided and arranged along the X direction. The light emitter 21 includes a first light emitter 21a emitting light in a first color, a second light emitter 21b emitting light in a second color, and a third light emitter 21c emitting light in a third color. The first color, the second color, and the third color are different from one another; the first color being red, the second color being green, and the third color being blue. That is, the color of light of the first light emitter 21a is red; the color of light of the second light emitter 21b is green; and the color of light of the third light emitter 21c is blue. Hereinafter, the first light emitter 21a, the second light emitter 21b, and the third light emitter 21c will each be simply referred to as a "light emitter SL" when they are described without being distinguished from one another.

The number and the colors of the light emitters SL included in the light emitter 21 are not limited to the number and the colors described above. For example, the number of the light emitters SL may be one and the color of the light emitter SL may be white. In that case, grayscale or black-and-white images are displayed in the display area DA.

The light emitter SL emits the light toward the light guide 22. The light emitter SL is a light-emitting diode (LED), for example. The light of the light emitter SL corresponds to the light of the light source device 20. Hereinafter, the light of the light source device 20 (that is, the light of the light emitter SL) is referred to as first light.

The light guide 22 has a rectangular solid shape. The light guide 22 has an opposing surface 22a and an opposite surface 22b. The opposing surface 22a faces the light emitter SL, and the opposite surface 22b is located opposite the opposing surface 22a and faces the fourth YB side surface 15e of the second base member 15. The light guide 22 has a shape continuous from the fourth XL side surface 15c to the fourth XR side surface 15d in plan view. The light guide 22 has a light-transmitting property. The first light of the light emitters SL enters the light guide 22 from the opposing surface 22a, is diffused in the light guide 22, and is output from the opposite surface 22b toward the fourth YB side surface 15e of the second base member 15 with a uniformized light quantity.

The first light of the light emitters SL that has entered from the fourth YB side surface 15e of the second base member 15 propagates in the display panel 10 from the first side surface 10c of the display panel 10 toward the second side surface 10d opposite the first side surface 10c. Specifically, the first light of the light emitters SL is reflected by the front surfaces 11a, 12a, 14a, 15a and the back surfaces 11b, 12b, 14b, 15b of the first substrate 11, the second substrate 12, the first base member 14, and the second base member 15 in the display panel 10, and propagates to the second side surface 10d.

The reflective member 30 is located on a side surface opposite the side surface facing the light source device 20 in the display panel 10. Specifically, the reflective member 30 is located on the second side surface 10d. The reflective member 30 is what is called reflective tape. The reflective member 30 includes a reflective layer 31 and an adhesive layer 32 overlapping the reflective layer 31.

The reflective layer 31 has a film shape. The material of the reflective layer 31 has relatively high reflectance. Examples of the material of the reflective layer 31 include aluminum and silver. The adhesive layer 32 has a light-transmitting property. The material of the adhesive layer 32 is an optical elasticity resin, which is cured by ultraviolet light.

The reflective member 30 reflects the first light from the second side surface 10d side toward the first side surface 10c side. That is, the first light emitted by the light source device 20 propagates in the display panel 10 from the first side surface 10c side toward the second side surface 10d side, reaches the reflective member 30, and is reflected by the reflective member 30 toward the first side surface 10c side. Hereinafter, the first light reflected by the reflective member 30 is referred to as second light. That is, the reflective member 30 reflects the first light from the second side surface 10d side toward the first side surface 10c side as the second light. In other words, the first light is reflected by the reflective member 30, and the second light enters from the second side surface 10d of the display panel 10.

Figure 3:
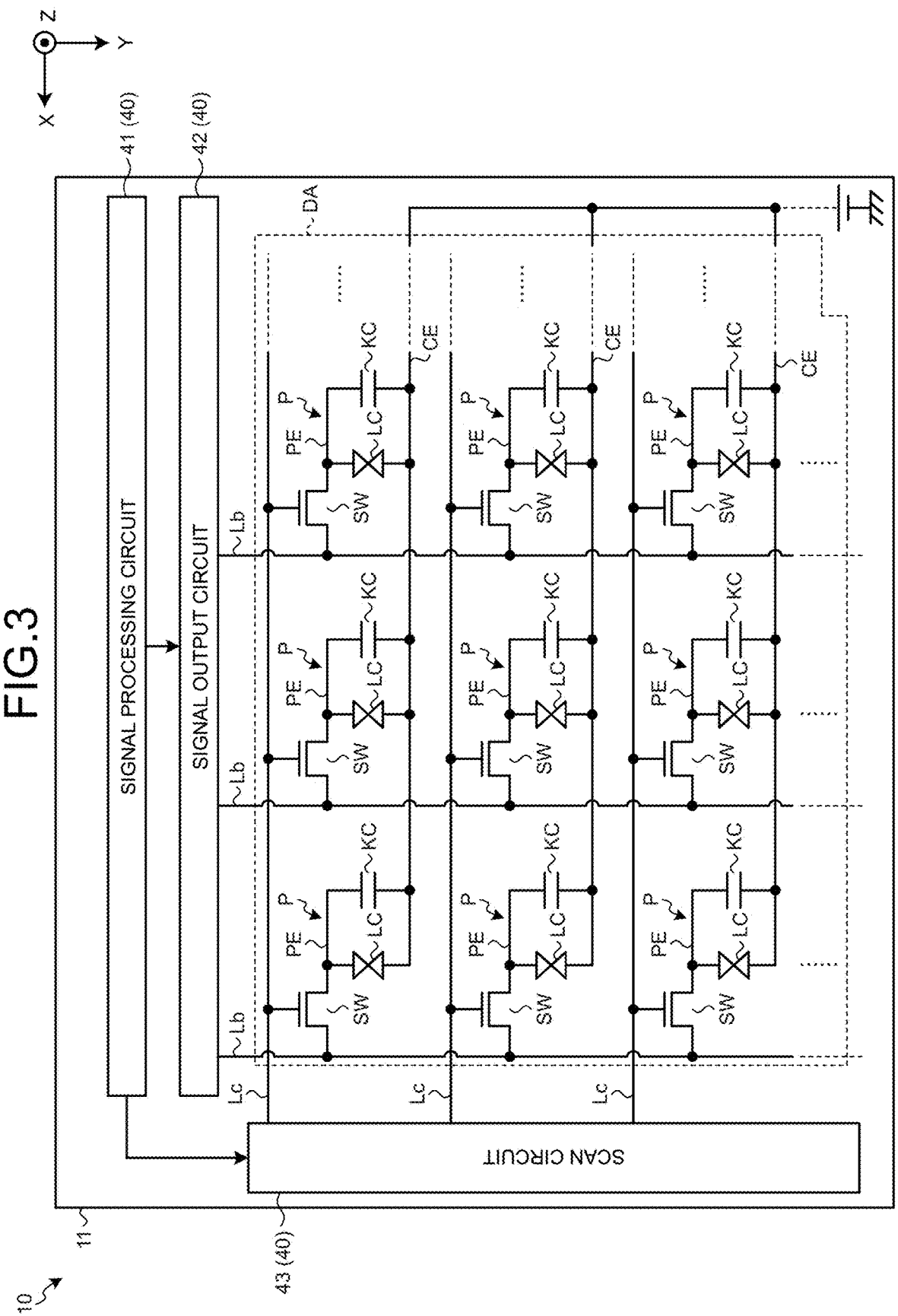
FIG. 3 is a diagram of a circuit configuration of a display panel.

FIG. 3 is a diagram illustrating a circuit configuration of the display panel 10. As illustrated in FIGS. 1 and 3, the first drive circuit 40 is located on the first substrate 11. The first drive circuit 40 calculates output gradation values (to be described later) based on the image signals transmitted from the external device. The first drive circuit 40 applies voltages to the pixels P according to the output gradation values (details will be described later). The first drive circuit 40 includes a signal processing circuit 41, a signal output circuit 42, and a scan circuit 43.

The signal processing circuit 41 generates a plurality of pixel drive signals based on the image signals (details will be described later) and outputs the pixel drive signals to the signal output circuit 42. The signal processing circuit 41 outputs clock signals to the signal output circuit 42 and the scan circuit 43 to synchronize the operation of the signal output circuit 42 with the operation of the scan circuit 43.

The signal output circuit 42 outputs each of the pixel drive signals to the corresponding pixel P. As illustrated in FIG. 3, the signal output circuit 42 is electrically coupled to the pixels P through a plurality of signal lines Lb extending along the Y direction.

The scan circuit 43 scans the pixels P in synchronization with the output of the pixel drive signals by the signal output circuit 42. The scan circuit 43 is electrically coupled to the pixels P through a plurality of scan lines Lc extending along the X direction.

The pixels P each include a switching element SW, a pixel electrode PE, a common electrode CE, liquid crystal capacitance LC, and holding capacitance KC.

The switching element SW is configured as a thin-film transistor (TFT), for example. In the switching element SW, the source electrode is electrically coupled to a corresponding one of the signal lines Lb, and the gate electrode is electrically coupled to a corresponding one of the scan lines Lc.

The pixel electrode PE is coupled to the drain electrode of the switching element SW. A plurality of the common electrodes CE are arranged correspondingly to the scan lines Lc. The pixel electrode PE and the common electrode CE have a light-transmitting property.

The liquid crystal capacitance LC is a capacitive component of the liquid crystal material of the liquid crystal layer 13 (to be described later) disposed between the pixel electrode PE and the common electrode CE. The holding capacitance KC is disposed between an electrode having the same potential as the common electrode CE and an electrode having the same potential as the pixel electrode PE.

Figure 4:
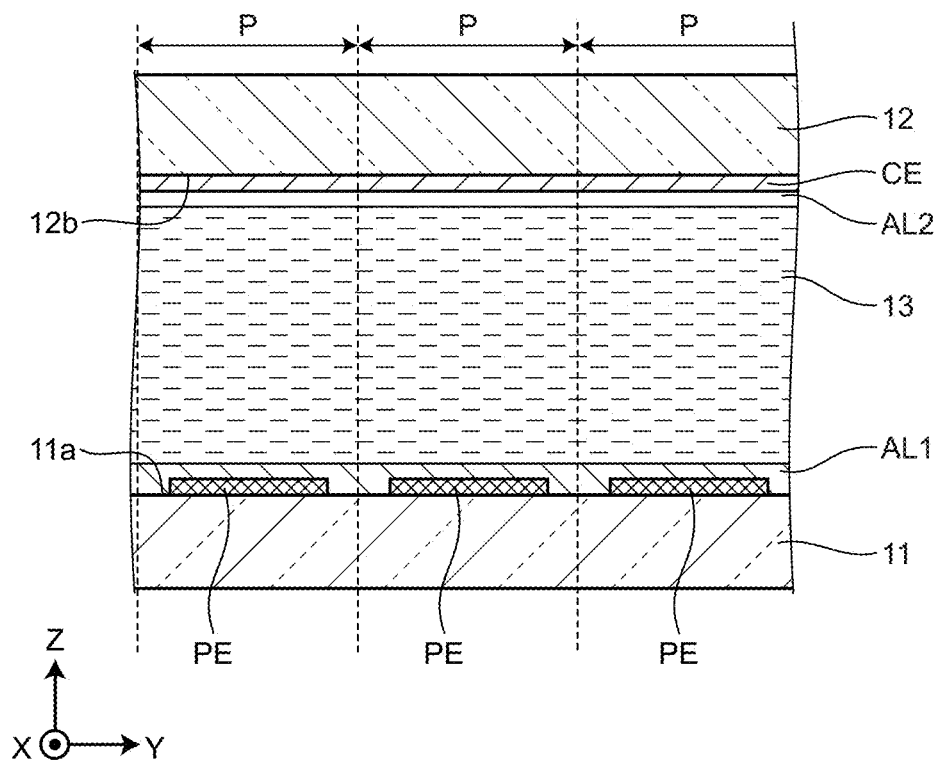
FIG. 4 is a sectional view of the display panel.

FIG. 4 is a sectional view of the display panel 10. The first base member 14 and the second base member 15 are not illustrated in FIG. 4. The signal lines Lb (not illustrated), the pixel electrodes PE, and the scan lines Lc (not illustrated) are arranged on the front surface 11a of the first substrate 11, while being electrically insulated. An area partitioned by two mutually adjacent signal lines Lb and two mutually adjacent scan lines Lc in plan view in the display panel 10 corresponds to the pixel P.

A first orientation film AL1 is disposed on the front surface 11a of the first substrate 11. The orientation direction of the first orientation film AL1 is along the Y direction. The signal lines Lb, the pixel electrodes PE, and the scan lines Lc are arranged between the first substrate 11 and the first orientation film AL1.

The common electrode CE and a second orientation film AL2 are disposed on the back surface 12b of the second substrate 12. The common electrode CE is disposed between the second substrate 12 and the second orientation film AL2. The orientation direction of the second orientation film AL2 is along the Y direction. That is, the orientation direction of the first orientation film AL1 and the orientation direction of the second orientation film AL2 are parallel to each other. The orientation direction of the first orientation film AL1 and the orientation direction of the second orientation film AL2 may be orthogonal to each other.

Figure 5:
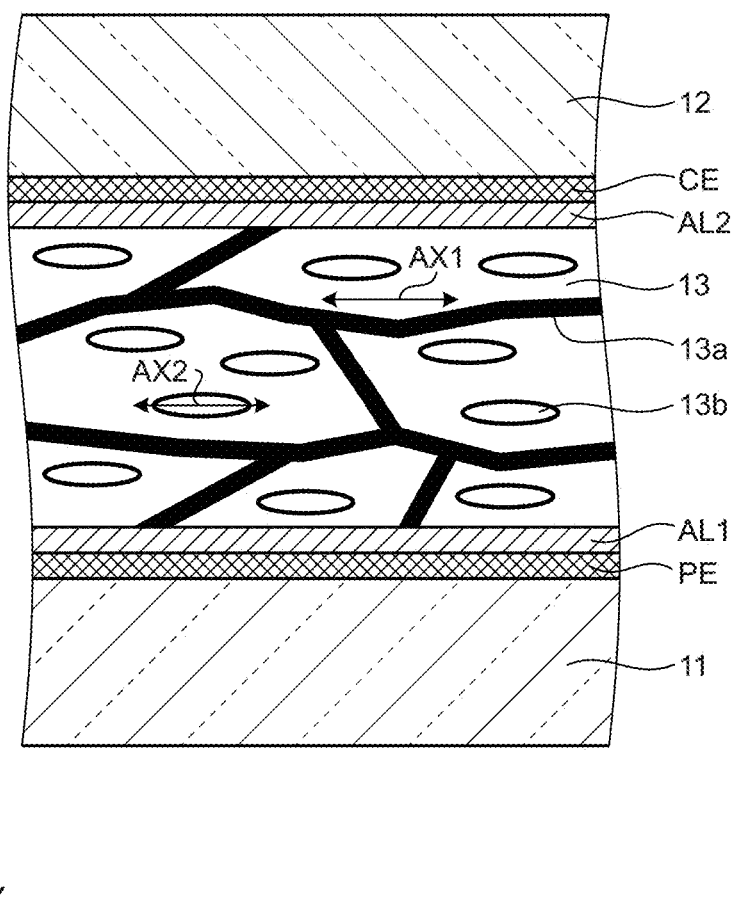
FIG. 5 is a partial enlarged sectional view of the display panel.

FIG. 5 is a partial enlarged sectional view of the display panel 10. The liquid crystal layer 13 contains polymer-dispersed liquid crystals. Specifically, the liquid crystal layer 13 includes a three-dimensional mesh-shaped polymer network 13a and liquid crystal molecules 13b.

The polymer network 13a is formed by polymerizing monomers oriented by the first orientation film AL1 and the second orientation film AL2 using ultraviolet light, heat, and the like. The liquid crystal molecules 13b are located in gaps of the polymer network 13a.

As illustrated in FIG. 1, the second drive circuit 50 is disposed on the support 18. The second drive circuit 50 drives the light source device 20 based on light control signals output from an external device (not illustrated) electrically coupled through a second flexible wiring substrate 2b.

The following describes a basic operation of the display device 1 when the display panel 10 displays an image. The first drive circuit 40 and the second drive circuit 50 drive the display panel 10 and the light source device 20 based on a field-sequential system.

First, a case will be described where the image signals and the light control signals are not transmitted to the display device 1 and the display panel 10 is not displaying an image. In this case, the first drive circuit 40 outputs no pixel drive signals, and no voltage is applied to the pixel electrode PE. The second drive circuit 50 does not drive the light source device 20, and no light is emitted from the light emitters SL.

When no voltage is applied to the pixel electrode PE, an optical axis AX1 of the polymer network 13a and an optical axis AX2 of the liquid crystal molecules 13b are regulated by the orientation directions of the first orientation film AL1 and the second orientation film AL2, as illustrated in FIG. 5. In the present first embodiment, when no voltage is applied to the pixel electrode PE, the optical axis of the polymer network 13a and the optical axis of the liquid crystal molecules 13b are parallel to each other and along the Y direction.

The ordinary-ray refractive index of the polymer network 13a and the ordinary-ray refractive index of the liquid crystal molecules 13b are equal to each other. When no voltage is applied to the pixel electrode PE, the difference between the refractive index of the polymer network 13a and the refractive index of the liquid crystal molecules 13b is zero in all directions. Therefore, the light propagating in the display panel 10 is not scattered. That is, in this case, the liquid crystal layer 13 is in a transmissive state of not scattering the light propagating in the display panel 10.

When the liquid crystal layer 13 is in the transmissive state, the background on the one plate surface side (for example, the back surface 10b side) of the display panel 10 is visible from the other plate surface side (for example, the front surface 10a side) of the display panel 10. When the liquid crystal layer 13 is in the transmissive state, the light from the light emitters SL propagating in the display panel 10 is also hardly scattered. Therefore, when the liquid crystal layer 13 is in the transmissive state, the background on the one plate surface side of the display panel 10 is visible from the other plate surface side of the display panel 10 even when the light of the light emitters SL is emitted based on the light control signals.

The following describes a case where the image signals and the light control signals are transmitted to the display device 1 and the display panel 10 displays an image. First, the first drive circuit 40 outputs the pixel drive signal and a voltage is applied to the pixel electrode PE.

When the voltage is applied to the pixel electrode PE, the optical axis AX2 of the liquid crystal molecules 13b tilts with respect to the Y direction according to the magnitude of the voltage. In contrast, the optical axis AX1 of the polymer network 13a does not tilt and is along the Y direction even when the voltage is applied to the pixel electrode PE. That is, the optical axis AX2 of the liquid crystal molecules 13b tilts with respect to the optical axis AX1 of the polymer network 13a.

This phenomenon causes a difference between the refractive index of the polymer network 13a and the refractive index of the liquid crystal molecules 13b. In this state, when the second drive circuit 50 emits the light from the light emitters SL based on the light control signals, the light that propagates in the display panel 10 is scattered. That is, in this case, the liquid crystal layer 13 is in a scattering state of scattering the light propagating in the display panel 10. The light scattered by the liquid crystal layer 13 is radiated outside the display panel 10 and is visible from both plate surface sides of the display panel 10.

The amount of the light scattered by the liquid crystal layer 13 varies with the degree of scattering of the liquid crystal layer 13. The degree of scattering of the liquid crystal layer 13 is dependent on the tilt of the liquid crystal molecules 13b, that is, the magnitude of the voltage applied to the pixel electrode PE. The magnitude of the voltage is dependent on each of the output gradation values contained in the pixel drive signals. The output gradation value is calculated by the first drive circuit 40 for each of the pixels P based on an input gradation value contained in each of the image signals (details will be described later). The input gradation value and the output gradation value are each a value (gradation value) indicating a gradation of the pixel P. The input gradation value is determined for each color of the pixel P. The color of the pixel P is obtained by combining the colors of three light emitters SL. That is, the input gradation value is determined for each color of the three light emitters SL, and the output gradation value is calculated for each color of the three light emitters SL.

Figure 6:
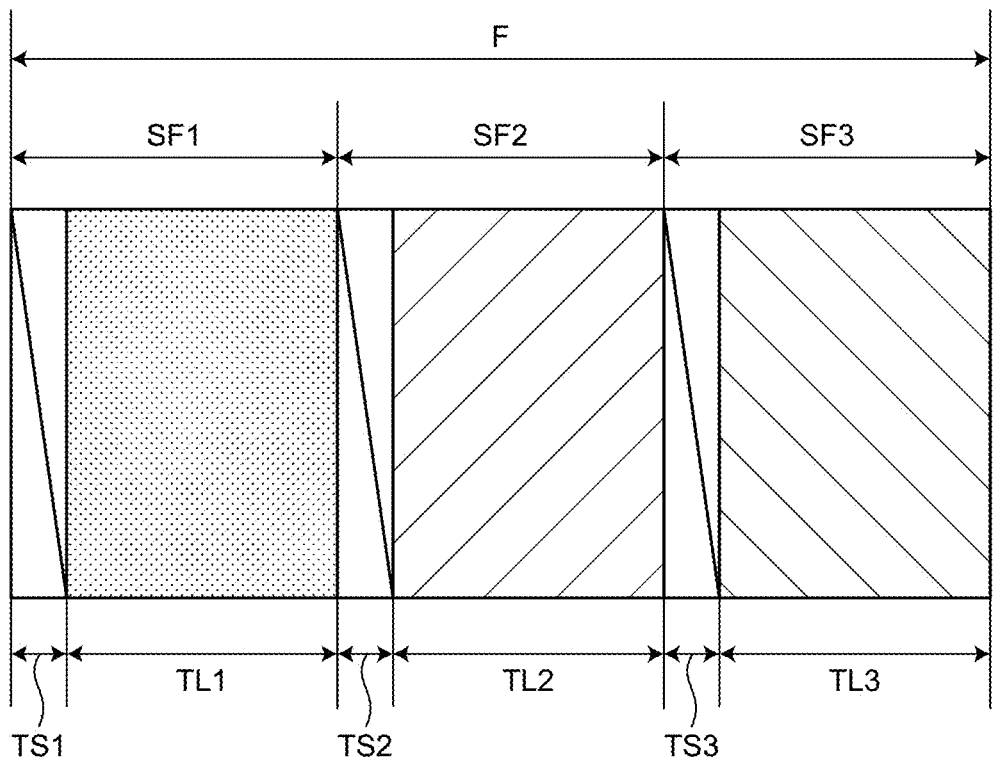
FIG. 6 is a diagram illustrating operations of a first drive circuit and a second drive circuit when an image is displayed on the display panel.

The first drive circuit 40 generates the pixel drive signal containing the output gradation value calculated based on the input gradation value for each of the pixels P, and transmits the pixel drive signals to the pixels P. As a result, in each of the pixels P, a voltage corresponding to the output gradation value is applied to the pixel electrode PE, and the liquid crystal molecules 13b corresponding to the pixel P tilt according to the magnitude of the output gradation value to change the degree of scattering of the liquid crystal layer 13, thereby changing the amount of externally emitted light. Increasing the output gradation value increases the voltage applied to the pixel electrode PE, increases the amount of externally emitted light, and increases the luminance of the pixel P viewed from both plate surface (front surface 10a and back surface 10b) sides of the display panel 10. FIG. 6 is a diagram illustrating operations of the first drive circuit 40 and the second drive circuit 50 when the image is displayed on the display panel 10. FIG. 6 illustrates the operations of the first drive circuit 40 and the second drive circuit 50 for one frame F. The one frame F includes a first sub-frame SF1, a second sub-frame SF2, and a third sub-frame SF3 in this order.

In the first sub-frame SF1, light in the first color (red) contained in the image is emitted from the pixel P. Specifically, the first drive circuit 40 scans the pixels P in a first scan period TS1, selects the pixel P to emit the light in the first color, and transmits the pixel drive signal corresponding to the first color to the selected pixel P. As a result, the liquid crystal layer 13 corresponding to the selected pixel P is brought into the scattering state in accordance with the output gradation value corresponding to the first color. The voltage applied to the pixel electrode PE is held during a first emission period TL1 and reset at the end of the first sub-frame SF1.

The second drive circuit 50 causes the first light emitter 21a to emit light during the first emission period TL1. The first light in the first color from the first light emitter 21a propagates in the display panel 10. Furthermore, the first light is reflected by the reflective member 30 and propagates as the second light in the first color in the display panel 10. As a result, in the liquid crystal layer 13 corresponding to the pixel P selected by the first drive circuit 40, the first light in the first color and the second light in the first color are scattered and externally emitted according to the degree of scattering of the liquid crystal layer 13. That is, the light (first light and second light) in the first color having a gradation corresponding to the output gradation value is emitted from the pixel P selected by the first drive circuit 40.

In the second sub-frame SF2, light in the second color (green) contained in the image is emitted from the pixel P. Specifically, the first drive circuit 40 scans the pixels P in a second scan period TS2, selects the pixel P to emit the light in the second color, and transmits the pixel drive signal corresponding to the second color to the selected pixel P. As a result, the liquid crystal layer 13 corresponding to the selected pixel P is brought into the scattering state in accordance with the output gradation value corresponding to the second color. The voltage applied to the pixel electrode PE is held during a second emission period TL2 and reset at the end of the second sub-frame SF2.

The second drive circuit 50 causes the second light emitter 21b to emit light during the second emission period TL2. The first light in the second color from the second light emitter 21b propagates in the display panel 10. Furthermore, the first light is reflected by the reflective member 30 and propagates as the second light in the second color in the display panel 10. As a result, in the liquid crystal layer 13 corresponding to the pixel P selected by the first drive circuit 40, the first light in the second color and the second light in the second color are scattered and externally emitted according to the degree of scattering of the liquid crystal layer 13. That is, the light (first light and second light) in the second color having a gradation corresponding to the output gradation value is emitted from the pixel P selected by the first drive circuit 40.

In the third sub-frame SF3, light in the third color (blue) contained in the image is emitted from the pixel P. Specifically, the first drive circuit 40 scans the pixels P in a third scan period TS3, selects the pixel P to emit the light in the third color, and transmits the pixel drive signal corresponding to the third color to the selected pixel P. As a result, the liquid crystal layer 13 corresponding to the selected pixel P is brought into the scattering state in accordance with the output gradation value corresponding to the third color. The voltage applied to the pixel electrode PE is held during a third emission period TL3 and reset at the end of the third sub-frame SF3.

The second drive circuit 50 causes the third light emitter 21c to emit light during the third emission period TL3. The first light in the third color from the third light emitter 21c propagates in the display panel 10. Furthermore, the first light is reflected by the reflective member 30 and propagates as the second light in the third color in the display panel 10. As a result, in the liquid crystal layer 13 corresponding to the pixel P selected by the first drive circuit 40, the first light in the third color and the second light in the third color are scattered and externally emitted according to the degree of scattering of the liquid crystal layer 13. That is, the light (first light and second light) in the third color having a gradation corresponding to the output gradation value is emitted from the pixel P selected by the first drive circuit 40.

The time of the one frame F is set to a time in which a human eye recognizes light obtained by combining the light in the first color, the light in the second color, and the light in the third color emitted in the one frame F. That is, the human eye recognizes the light having a color and a gradation obtained by combining the first color, the second color, and the third color. Thus, the image is viewed by the emission of the light in the first color, the light in the second color, and the light in the third color from the pixels P as described above. In this case, the background on the one plate surface side of the display panel 10 is viewed in the state of overlapping the image when the display area DA is viewed from the other plate surface side of the display panel 10.

In the display device 1 described above, a phenomenon described below occurs. As described above, the first light propagates in the display panel 10 from the first side surface 10c toward the second side surface 10d. The display panel 10 includes elements such as the signal lines Lb, the pixel electrodes PE, and the switching elements SW as described above, and the light from the light emitters SL is scattered by hitting these elements. In other words, the first light of the light emitters SL is consumed by the elements.

When the liquid crystal layer 13 corresponding to any of the pixels P is in the scattering state, part of the first light of the light emitters SL is externally emitted at the pixel P, so that the amount of the first light of the light emitters SL propagating from the pixel P toward the second side surface 10d side decreases compared with a case where the liquid crystal layer 13 corresponding to the pixel P is in the transmissive state. In other words, the light of the light emitters SL is consumed by the liquid crystal layer 13 in the scattering state. As the first light is consumed in this way, the amount of the first light from the light emitters SL propagating in the display panel 10 gradually decreases.

The second light that enters the display panel 10 when the reflective member 30 reflects the first light, is also consumed by the elements included in the display panel 10 and the liquid crystal layer 13 in the scattering state while the second light propagates from the second side surface 10d toward the first side surface 10c in the display panel 10. Thus, the amount of the second light propagating in the display panel 10 gradually decreases as the second light is consumed.

Figure 7:
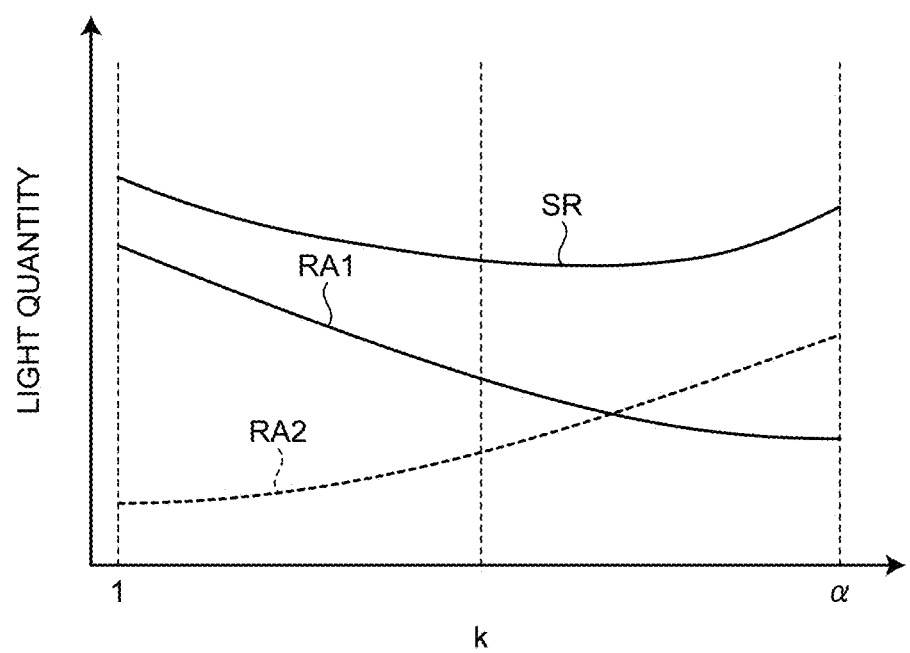
FIG. 7 is a graph illustrating light quantities of a plurality of pixels arranged along a first direction from a first side surface toward a second side surface.

FIG. 7 is a graph illustrating light quantities of the pixels P arranged along the first direction W1 from the first side surface 10c toward the second side surface 10d. The vertical axis in FIG. 7 indicates the light quantity. The symbol k along the horizontal axis in FIG. 7 indicates positions of the pixels P arranged along the first direction W1. The first direction W1 is along the Y direction in the present first embodiment. k=1 corresponds to the position of the pixel P located on the most first side surface 10c side in the first direction W1. k=α corresponds to the position of the pixel P located on the most second side surface 10d side in the first direction W1. The symbol a represents the number of the pixels P arranged along the first direction W1 and is 1080, for example.

As described above, when the first light propagates along the first direction W1 from the first side surface 10c side toward the second side surface 10d side in the display panel 10, the first light is consumed by the elements included in the display panel 10 and the liquid crystal layer 13 in the scattering state. Therefore, in FIG. 7, a first light quantity RA1 of the first light decreases from the first side surface 10c side toward the second side surface 10d side.

As described above, when the second light propagates along the first direction W1 from the second side surface 10d side toward the first side surface 10c side in the display panel 10, the second light is consumed by the elements included in the display panel 10 and the liquid crystal layer 13 in the scattering state. Therefore, in FIG. 7, a second light quantity RA2 of the second light decreases from the second side surface 10d side toward the first side surface 10c side.

In the present embodiment, the second light quantity RA2 is larger than the first light quantity RA1 at the pixel P where k=α. This is because light present inside the first substrate 11 and the like even before the light emitters SL emit the first light is changed in traveling direction due to the scattering that occurs when the first light is reflected, and the light changed in traveling direction is incorporated into the second light quantity RA2. At the pixel P at k=α, the second light quantity RA2 may be equal to or smaller than the first light quantity RA1.

The degrees of decrease in the first light quantity RA1 and the second light quantity RA2 illustrated in FIG. 7 are exemplary and vary depending on the elements included in the display panel 10 and the degree of scattering of the liquid crystal layer 13. The degrees of decrease in the first light quantity RA1 and the second light quantity RA2 illustrated in FIG. 7 correspond, for example, to a case where the output gradation values corresponding to the pixels P are equal to one another.

A total light quantity SR illustrated in FIG. 7 is a light quantity obtained by summing the first light quantity RA1 and the second light quantity RA2. The total light quantity SR is the sum of the first light quantity RA1 and the second light quantity RA2. The total light quantity SR decreases and then increases as the position shifts from the first side surface 10c side toward the second side surface 10d along the first direction W1.

For example, when "white" is to be displayed in the entire display area DA at the same brightness based on the image signals, the input gradation values corresponding to the respective pixels P are set equal to one another, and the output gradation values corresponding to the pixels P are generally set equal to one another. As described above, the total light quantity SR illustrated in FIG. 7 decreases and then increases as the position shifts from the first side surface 10c side toward the second side surface 10d along the first direction W1. Thus, the luminance of the pixel P decreases and then increases as the position shifts from the first side surface 10c side toward the second side surface 10d along the first direction W1. Therefore, the brightness of "white" displayed in the display area DA decreases and then increases as the position shifts from the first side surface 10c side toward the second side surface 10d along the first direction W1. That is, in this case, "white" is not displayed at the same brightness in the entire display area DA, and the desired display cannot be achieved.

Therefore, the first drive circuit 40 of the first embodiment of the present disclosure calculates the output gradation values as described below.

Figure 8:
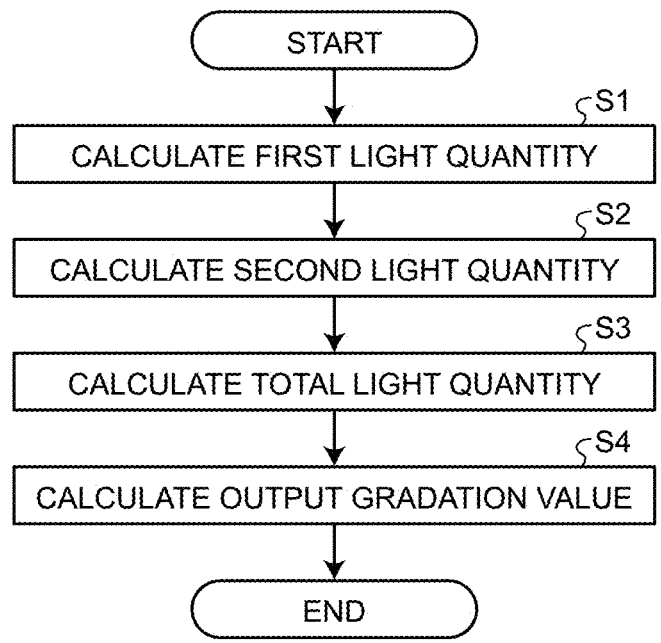
FIG. 8 is a flowchart of processing executed by the first drive circuit.

FIG. 8 is a flowchart of processing executed by the first drive circuit 40. For ease of explanation, the following describes a case of displaying "white" at the same brightness in the entire display area DA based on the image signals. In this case, as described above, the input gradation values corresponding to the pixels P are equal to one another. The first drive circuit 40 acquires the input gradation values contained in the image signals and then executes the processing of the flowchart in FIG. 8.

The first drive circuit 40 calculates the first light quantity RA1 at each of the pixels P at Step S1. The first drive circuit 40 first calculates the first light quantity RA1 of the pixel P at k=1. The first light quantity RA1 of the pixel P at k=1 is the quantity of the first light when the first light is incident on the first side surface 10c. The light quantity of the first light when the first light is incident on the first side surface 10c is derived in advance by experiment, simulation, and the like, and stored in advance in a storage (not illustrated) of the first drive circuit 40. The first light quantity RA1 of the pixel P at k=1 is set to the light quantity of the first light stored in the storage.

The first drive circuit 40 then calculates a first reduction ratio (corresponding to "first light scattering degree") and a second reduction ratio (corresponding to "third light scattering degree"), which are to be described below.

The first light that propagates through the pixels P is consumed by hitting and scattering at the elements such as the signal lines Lb, the pixel electrodes PE, and the switching elements SW included in the display panel 10, as described above. The first light that propagates through the pixels P is also consumed by being absorbed by metal parts such as the switching elements SW and glass parts such as the first substrate 11. Taking these factors into consideration, the first reduction ratio is assumed to correspond to the ratio of reduction of the first light as the first light propagates through the pixels P regardless of whether each of the pixels P is displayed or the position of the pixel P. That is, the first reduction ratio depends on the structure of the pixel P, but is a constant value regardless of the position of the pixel P. In the present first embodiment, the first reduction ratio is set to a first predetermined ratio (for example, 1%) (first reduction ratio=first predetermined ratio) and is equal among the pixels P.

When any of the pixels P is in a display state, that is, when the liquid crystal layer 13 in the pixel P is in the scattering state, the light propagating through this pixel P is consumed by scattering in the liquid crystal layer 13. The second reduction ratio corresponds to the ratio of reduction of the first light propagating through any of the pixels P caused by the reason that the liquid crystal layer 13 corresponding to the pixel P is in the scattering state. The second reduction ratio changes with the degree of scattering state of the liquid crystal layer 13. Specifically, the second reduction ratio increases as the degree of scattering of the liquid crystal layer 13 increases at the pixel P, that is, as the input gradation value for the pixel P increases. In the present first embodiment, the first drive circuit 40 calculates the second reduction ratio by multiplying the input gradation value corresponding to the pixel P by a second predetermined ratio (for example, 5%) (second reduction ratio=input gradation value×second predetermined ratio). The second predetermined ratio is a constant value regardless of the position of the pixel P. The second predetermined ratio and the first reduction ratio described above are derived in advance by experiment, simulation, and the like, and stored in the storage.

The first drive circuit 40 calculates the first and the second reduction ratios as described above for the pixel P at k=1. The sum of the values obtained by multiplying the calculated first and second reduction ratios by the first light quantity RA1 of the pixel P at k=1 corresponds to the light quantity of the first light consumed at the pixel P at k=1. The light quantity obtained by subtracting the light quantity of the first light consumed at the pixel P at k=1 from the first light quantity RA1 of the pixel P at k=1 corresponds to the first light quantity RA1 of the pixel P at k=2.

Furthermore, the first drive circuit 40 calculates the first and the second reduction ratios at the pixel P at k=2 using the first light quantity RA1 of the pixel P at k=2 as described above, and based on these calculation results, calculates the first light quantity RA1 of the pixel P at k=3 as described above. Thus, for each of the pixels P from k=1 to k=α, the first drive circuit 40 calculates the first light quantity RA1 of the pixel P at k=i (i is an integer from 2 to α) using the first light quantity RA1, the first reduction ratio, and the second reduction ratio of the pixel P at k=i−1.

Assuming that, of two adjacent pixels P of the pixels P arranged along the first direction W1 from the first side surface 10c toward the second side surface 10d, the pixel P on the first side surface 10c side is referred to as a first side pixel P, and the pixel P on the second side surface 10d side is referred to as a second side pixel P. The first drive circuit 40 calculates the first light quantity RA1 at the second side pixel P using the first reduction ratio caused by irradiation of the elements included in the display panel 10 by the first light at the first side pixel P. The first drive circuit 40 calculates the first light quantity RA1 at the second side pixel P using the second reduction ratio that changes based on the input gradation value at the first side pixel P.

The first light quantity RA1 calculated by the first drive circuit 40 decreases from the first side surface 10c side toward the second side surface 10d side, as illustrated in FIG. 7.

The first drive circuit 40 then calculates the second light quantity RA2 at each of the pixels P at Step S2 illustrated in FIG. 8. The first drive circuit 40 first calculates the second light quantity RA2 of the pixel P at k=α. The first drive circuit 40 calculates the second light quantity RA2 of the pixel P at k=α by multiplying the first light quantity RA1 of the pixel P at k=α by a predetermined coefficient. The predetermined coefficient is derived in advance by experiment, simulation, and the like, and stored in the storage in advance. If the second light quantity RA2 of the pixel P at k=α is larger than the first light quantity RA1 of the pixel P at k=α as illustrated in FIG. 7, the predetermined coefficient is larger than 1.

The first drive circuit 40 further calculates a third reduction ratio (corresponding to "second light scattering degree") and a fourth reduction ratio (corresponding to "fourth light scattering degree"), which are to be described below.

The third reduction ratio corresponds to the ratio of reduction of the second light consumed by the elements included in the display panel 10. The third reduction ratio is equal to the first reduction ratio described above. That is, in the present first embodiment, the third reduction ratio is set to the first predetermined ratio (for example, 1%) (third reduction ratio=first predetermined ratio) and is equal among the pixels P. The third reduction ratio may be set to a third predetermined ratio different from the first predetermined ratio.

The fourth reduction ratio corresponds to the ratio of reduction of the second light propagating through any of the pixels P caused by the reason that the liquid crystal layer 13 corresponding to the pixel P is in the scattering state. The fourth reduction ratio changes with the degree of scattering state of the liquid crystal layer 13 in the same way as the second reduction ratio described above. In the present first embodiment, the first drive circuit 40 calculates the fourth reduction ratio by multiplying the input gradation value corresponding to the pixel P by the second predetermined ratio (fourth reduction ratio=input gradation value×second predetermined ratio) in the same way as the second reduction ratio described above. For the fourth reduction ratio, a fourth predetermined ratio different from the second predetermined ratio may be used instead of the second predetermined ratio. If the third and the fourth predetermined ratios mentioned above are used, the third and the fourth predetermined ratios are derived in advance by experiment, simulation, and the like, and stored in the storage.

The first drive circuit 40 calculates the third and the fourth reduction ratios as described above for the pixel P at k=α. The sum of the values obtained by multiplying the calculated third and fourth reduction ratios by the second light quantity RA2 of the pixel P at k=α corresponds to the light quantity of the second light consumed at the pixel P at k=α. The light quantity obtained by subtracting the light quantity of the second light consumed at the pixel P at k=α from the second light quantity RA2 of the pixel P at k=α corresponds to the second light quantity RA2 of the pixel P at k=α−1.

Furthermore, the first drive circuit 40 calculates the third and the fourth reduction ratios at the pixel P at k=α−1 using the second light quantity RA2 of the pixel P at k=α−1 as described above, and based on these calculation results, calculates the second light quantity RA2 of the pixel P at k=α−2 as described above. Thus, for each of the pixels P from k=1 to k=α, the first drive circuit 40 calculates the second light quantity RA2 of the pixel P at k=j (j is an integer from 1 to α−1) using the second light quantity RA2, the third reduction ratio, and the fourth reduction ratio of the pixel P at k=j+1.

Assuming that, of two adjacent pixels P of the pixels P arranged along the first direction W1 from the first side surface 10c toward the second side surface 10d, the pixel P on the first side surface 10c side is referred to as a first side pixel P, and the pixel P on the second side surface 10d side is referred to as a second side pixel P. The first drive circuit 40 calculates the second light quantity RA2 at the first side pixel P using the third reduction ratio caused by irradiation of the elements included in the display panel 10 by the second light at the second side pixel P. The first drive circuit 40 calculates the second light quantity RA2 at the first side pixel P using the fourth reduction ratio that changes based on the input gradation value at the second side pixel P.

The second light quantity RA2 calculated by the first drive circuit 40 decreases from the second side surface 10d side toward the first side surface 10c side, as illustrated in FIG. 7.

The first drive circuit 40 further calculates the total light quantity SR at each of the pixels P at Step S3 illustrated in FIG. 8. The total light quantity SR is a light quantity obtained by summing the first light quantity RA1 and the second light quantity RA2. The first drive circuit 40 calculates the total light quantity SR by adding the second light quantity RA2 to the first light quantity RA1. As illustrated in FIG. 7, the total light quantity SR decreases and then increases as the position shifts from the first side surface 10c side toward the second side surface 10d along the first direction W1. The minimum value of the total light quantity SR is located on the second side surface 10d side of the center in the first direction W1.

The first drive circuit 40 then calculates the output gradation value based on the input gradation value and the total light quantity SR for each of the pixels P at Step S4 illustrated in FIG. 8. Specifically, the first drive circuit 40 calculates the ratio of the total light quantity SR at each of the pixels P when the maximum value of the total light quantity SR is assumed to be "1" (ratio=total light quantity SR at pixel P/maximum value of total light quantity SR). The first drive circuit 40 further calculates the output gradation value by dividing the input gradation value by the ratio calculated for each of the pixels P (output gradation value=input gradation value/ratio).

Figure 9:
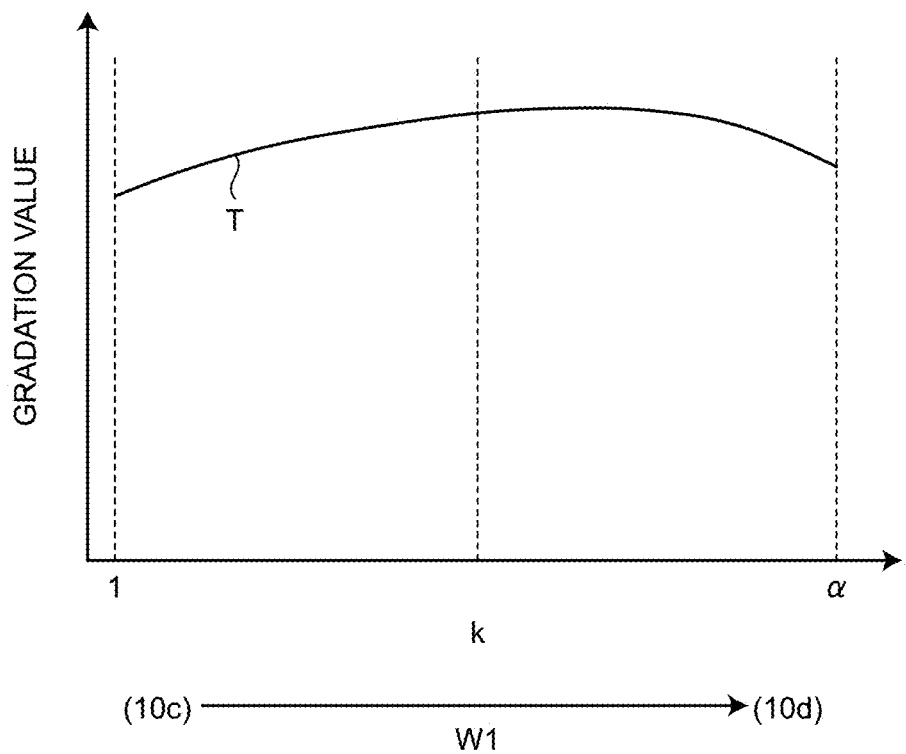
FIG. 9 is a graph illustrating an output gradation value when input gradation values of the pixels are equal to one another and a total light quantity corresponds to the total light quantity illustrated in FIG. 7.

FIG. 9 is a graph illustrating an output gradation value T when the input gradation values of the pixels P are equal to one another and the total light quantity SR corresponds to the total light quantity SR illustrated in FIG. 7. The horizontal axis illustrated in FIG. 9 is the same as that illustrated in FIG. 7. The vertical axis illustrated in FIG. 9 indicates the gradation value.

The output gradation value T that is calculated by the first drive circuit 40 as described above increases and then decreases as the position shifts from the first side surface 10c side toward the second side surface 10d along the first direction W1. The total light quantity SR illustrated in FIG. 7 decreases and then increases as the position shifts from the first side surface 10c side toward the second side surface 10d along the first direction W1 as described above.

With such a relation between the output gradation value T (FIG. 9) and the total light quantity SR (FIG. 7), the luminance levels of the pixels P are made approximately equal to one another. In this case, "white" is displayed at almost the same brightness in the entire display area DA, and the desired display can be achieved. Thus, in the display device 1 including the display panel 10 onto which the light is incident from the two side surfaces (first side surface 10c and second side surface 10d) located opposite to each other, the luminance of the pixels P can be uniformized when the input gradation values corresponding to the pixels P are equal to one another.

Thus, the first drive circuit 40 calculates the light quantity obtained by summing the first light quantity RA1 of the first light and the second light quantity RA2 of the second light at each of the pixels P, calculates the output gradation value for each of the pixels P based on the input gradation value contained in the image signal, and applies the voltage corresponding to the output gradation value to the pixel P.

When the input gradation values corresponding to the pixels P are equal to one another, the first drive circuit 40 increases, among the pixels P, the output gradation values corresponding to the pixels P arranged along the first direction W1 from the first side surface 10c toward the second side surface 10d and then reduces the output gradation values along the first direction W1.

Second Embodiment

The following describes the display device 1 according to a second embodiment of the present disclosure mainly in differences from the display device 1 of the first embodiment described above.

Figure 10:
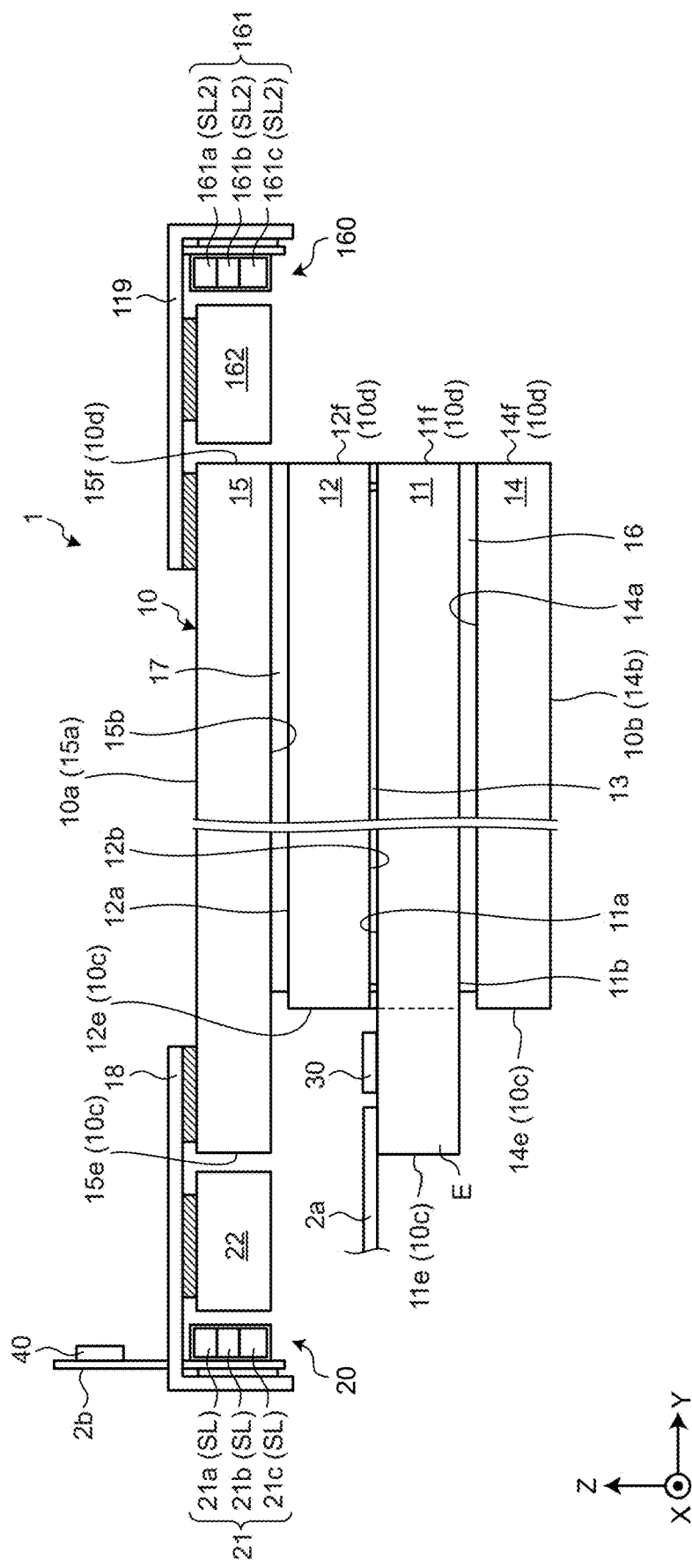
FIG. 10 is a view illustrating a configuration of the display device according to a second embodiment of the present disclosure.

FIG. 10 is a view illustrating a configuration of the display device 1 according to the second embodiment of the present disclosure. Unlike the display device 1 of the first embodiment described above, the display device 1 of the present second embodiment does not include the reflective member 30, but includes a second light source device 160.

The second light source device 160 is located on a lateral side of the display panel 10. The second light source device 160 is located opposite the light source device 20 with the display panel 10 interposed therebetween. Specifically, the second light source device 160 is located on the second side surface 10d side of the display panel 10 and faces the fourth YF side surface 15f of the second base member 15. The second light source device 160 emits light from the second side surface 10d side of the display panel 10 toward the first side surface 10c side. The second light source device 160 is fixed to the second base member 15 with a support 119 interposed therebetween.

The second light source device 160 is configured in the same way as the light source device 20 described above. The second light source device 160 includes a light emitter 161 corresponding to the light emitter 21 described above and a light guide 162 corresponding to the light guide 22 described above.

The light emitter 161 includes a first light emitter 161a corresponding to the first light emitter 21a described above, a second light emitter 161b corresponding to the second light emitter 21b described above, and a third light emitter 161c corresponding to the third light emitter 21c described above. The first light emitter 161a, the second light emitter 161b, and the third light emitter 161c will each be simply referred to as a "light emitter SL2" when being described without being distinguished from one another.

The light emitter SL2 emits the light toward the light guide 162. The light of the light emitter SL2 corresponds to the light of the second light source device 160. Hereinafter, the light of the second light source device 160 (that is, the light of the light emitter SL2) is referred to as third light.

The second light source device 160 is driven by the second drive circuit 50. The second drive circuit 50 drives the second light source device 160 based on the field-sequential system mentioned above. The light-emitting timing and the colors of the light emitted by the second light source device 160 are the same as the light-emitting timing and the colors of the light emitted by the light source device 20.

The third light of the light emitter SL2 enters the light guide 162, is diffused in the light guide 162, and is output toward the fourth YF side surface 15f of the second base member 15 with a uniformized light quantity.

The third light of the light emitter SL2 that has entered from the fourth YF side surface 15f of the second base member 15 propagates in the display panel 10 from the second side surface 10d toward the first side surface 10c of the display panel 10. Specifically, the third light of the light emitter SL2 is reflected by the front surfaces 11a, 12a, 14a, 15a and the back surfaces 11b, 12b, 14b, 15b of the first substrate 11, the second substrate 12, the first base member 14, and the second base member 15 in the display panel 10, and propagates to the first side surface 10c.

Figure 11:
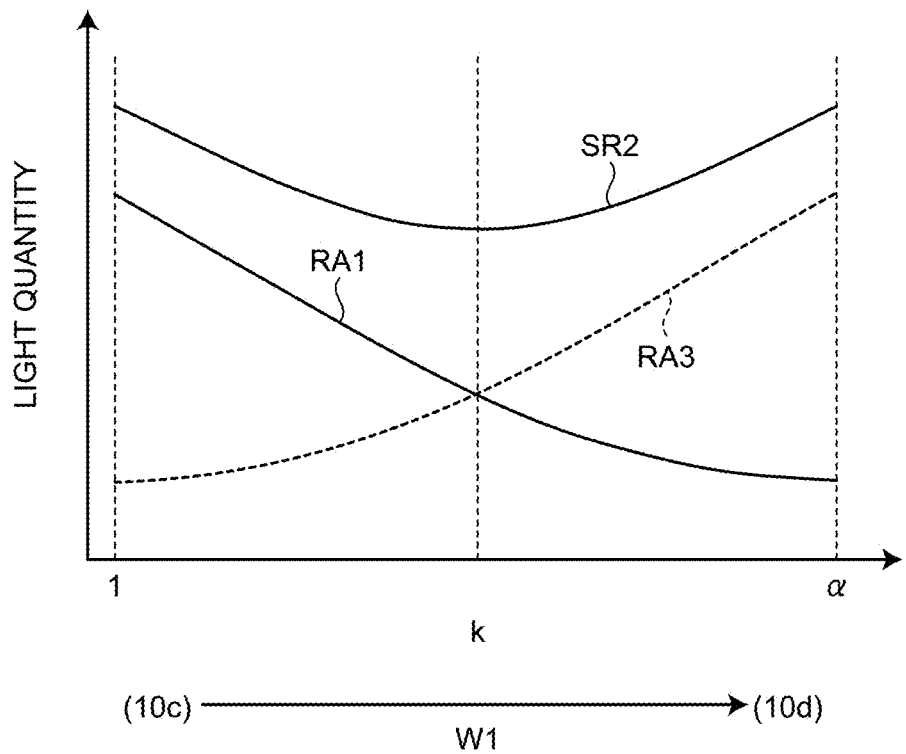
FIG. 11 is a graph illustrating light quantities of the pixels arranged along the first direction from the first side surface toward the second side surface in the display device according to the second embodiment of the present disclosure.

FIG. 11 is a graph illustrating the light quantities of the pixels P arranged along the first direction W1 from the first side surface 10c toward the second side surface 10d in the display device 1 according to the second embodiment of the present disclosure. The vertical and horizontal axes in FIG. 11 are the same as those in FIG. 7. FIG. 11 illustrates the first light quantity RA1 of the first light illustrated in FIG. 7. FIG. 11 also illustrates the third light quantity RA3 of the third light.

In the same way as the first light, the third light is consumed by the elements included in the display panel 10 and the liquid crystal layer 13 in the scattering state while propagating in the display panel 10 along the first direction W1 from the second side surface 10d side to the first side surface 10c side. Therefore, the third light quantity RA3 of the third light decreases from the second side surface 10d side toward the first side surface 10c side.

The degrees of decrease in the first light quantity RA1 and the third light quantity RA3 illustrated in FIG. 11 are exemplary and vary depending on the elements included in the display panel 10 and the degree of scattering of the liquid crystal layer 13. The degrees of decrease in the first light quantity RA1 and the third light quantity RA3 illustrated in FIG. 11 correspond, for example, to a case where the output gradation values corresponding to the pixels P are equal to one another.

Figure 12:
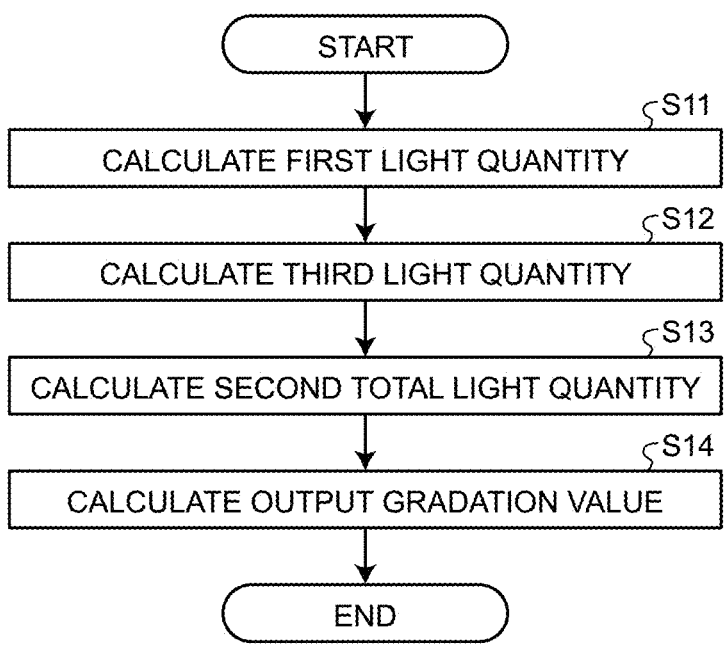
FIG. 12 is a flowchart of processing executed by the first drive circuit of the display device according to the second embodiment of the present disclosure.

FIG. 12 is a flowchart of processing executed by the first drive circuit 40 of the display device 1 according to the second embodiment of the present disclosure. The first drive circuit 40 of the present second embodiment calculates the output gradation value by executing the flowchart illustrated in FIG. 12 instead of the flowchart illustrated in FIG. 7.

For ease of explanation, the following describes the case of displaying "white" at the same brightness in the entire display area DA based on the image signals. In this case, as described above, the input gradation values corresponding to the pixels P are equal to one another.

The first drive circuit 40 calculates the first light quantity RA1 at each of the pixels P at Step S11 illustrated in FIG. 12, in the same way as Step S1 of the first embodiment described above. The first light quantity RA1 calculated by the first drive circuit 40 decreases from the first side surface 10c side toward the second side surface 10d side, as illustrated in FIG. 11.

The first drive circuit 40 then calculates the third light quantity RA3 at each of the pixels P at Step S12 illustrated in FIG. 12. The first drive circuit 40 first calculates the third light quantity RA3 of the pixel P at k=α. The third light quantity RA3 of the pixel P at k=α is the quantity of the third light when the third light is incident on the second side surface 10d. The light quantity of the third light emitted by the light emitter SL2 is derived in advance by experiment, simulation, and the like, and stored in advance in the storage of the first drive circuit 40. The third light quantity RA3 of the pixel P at k=α is set to the light quantity of the third light stored in the storage. The second light source device 160 has the same configuration as the light source device 20 described above. Therefore, the third light quantity RA3 of the pixel P at k=α is equal to the first light quantity RA1 of the pixel P at k=1.

The first drive circuit 40 then calculates a fifth reduction ratio and a sixth reduction ratio, which are to be described below.

The fifth reduction ratio corresponds to the ratio of reduction of the third light consumed by the elements included in the display panel 10. Therefore, the fifth reduction ratio is equal to the first reduction ratio described above. That is, in the present second embodiment, the fifth reduction ratio is set to the first predetermined ratio (for example, 1%) (fifth reduction ratio=first predetermined ratio) and is equal among the pixels P. The fifth reduction ratio may be set to a fifth predetermined ratio different from the first predetermined ratio.

The sixth reduction ratio corresponds to the ratio of reduction of the third light propagating through any of the pixels P caused by the reason that the liquid crystal layer 13 corresponding to the pixel P is in the scattering state. The sixth reduction ratio changes with the degree of scattering state of the liquid crystal layer 13 in the same way as the second reduction ratio. In the present second embodiment, the first drive circuit 40 calculates the sixth reduction ratio by multiplying the input gradation value corresponding to the pixel P by the second predetermined ratio (sixth reduction ratio=input gradation value×second predetermined ratio) in the same way as the second reduction ratio described above. For the sixth reduction ratio, a sixth predetermined ratio different from the second predetermined ratio may be used instead of the second predetermined ratio. If the fifth and the sixth predetermined ratios mentioned above are used, the fifth and the sixth predetermined ratios are derived in advance by experiment, simulation, and the like, and stored in the storage.

The first drive circuit 40 calculates the fifth and the sixth reduction ratios as described above for the pixel P at k=α. The sum of the values obtained by multiplying the calculated fifth and sixth reduction ratios by the third light quantity RA3 of the pixel P at k=α corresponds to the light quantity of the third light consumed at the pixel P at k=α. Therefore, the light quantity obtained by subtracting the light quantity of the third light consumed at the pixel P at k=α from the third light quantity RA3 of the pixel P at k=α corresponds to the third light quantity RA3 of the pixel P at k=α−1.

Furthermore, the first drive circuit 40 calculates the fifth and the sixth reduction ratios at the pixel P at k=α−1 using the third light quantity RA3 of the pixel P at k=α−1 as described above, and based on these calculation results, calculates the third light quantity RA3 of the pixel P at k=α−2 as described above. Thus, for each of the pixels P from k=1 to k=α, the first drive circuit 40 calculates the third light quantity RA3 of the pixel P at k=j (j is an integer from 1 to α−1) using the third light quantity RA3, the fifth reduction ratio, and the sixth reduction ratio of the pixel P at k=j+1.

The third light quantity RA3 calculated by the first drive circuit 40 decreases from the second side surface 10d side toward the first side surface 10c side, as illustrated in FIG. 11. As described above, the third light quantity RA3 at the pixel P at k=α is equal to the first light quantity RA1 of the pixel P at k=1. The third light quantity RA3 and the first light quantity RA are line symmetrical with each other with respect to a straight line serving as an axis of symmetry that is parallel to the vertical axis in FIG. 11 and located in the center in the first direction W1. The first drive circuit 40 may perform the processes at Steps S11 and S12 described above in parallel.

The first drive circuit 40 further calculates a second total light quantity SR2 at each of the pixels P at Step S13 illustrated in FIG. 12. The second total light quantity SR2 is a light quantity obtained by summing the first light quantity RA1 and the third light quantity RA3. The first drive circuit 40 calculates the second total light quantity SR2 by adding the third light quantity RA3 to the first light quantity RA1. As illustrated in FIG. 11, the second total light quantity SR2 decreases and then increases as the position shifts from the first side surface 10c side toward the second side surface 10d along the first direction W1. As described above, the third light quantity RA3 and the first light quantity RA1 are line symmetrical with each other with respect to the straight line serving as the axis of symmetry that is parallel to the vertical axis in FIG. 11 and located in the center in the first direction W1. Therefore, the minimum value of the second total light quantity SR2 is located in the center in the first direction W1. The second total light quantity SR2 is line symmetrical with respect to the straight line serving as the axis of symmetry that is parallel to the vertical axis in FIG. 11 and located in the center in the first direction W1.

The first drive circuit 40 then calculates the output gradation value based on the input gradation value and the second total light quantity SR2 for each of the pixels P at Step S14 illustrated in FIG. 12. Specifically, the first drive circuit 40 calculates the ratio of the second total light quantity SR2 at each of the pixels P when the maximum value of the second total light quantity SR2 is assumed to be "1" (ratio=second total light quantity SR2 at pixel P/maximum value of second total light quantity SR2). The first drive circuit 40 further calculates the output gradation value by dividing the input gradation value by the ratio calculated for each of the pixels P (output gradation value=input gradation value/ratio).

Figure 13:
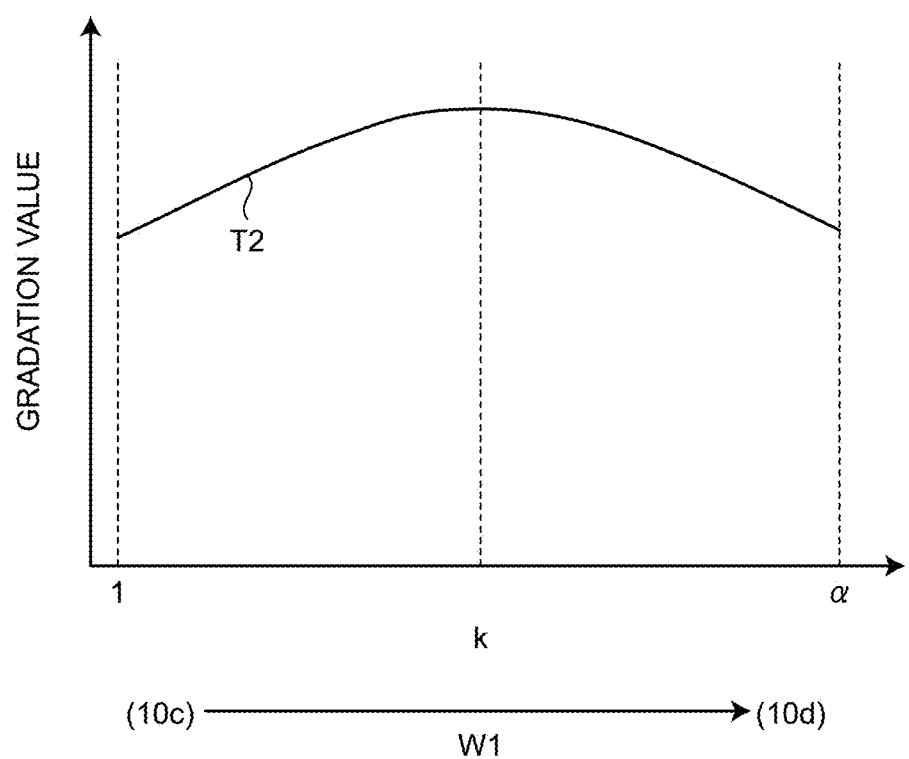
FIG. 13 is a graph illustrating the output gradation value when the input gradation values of the pixels are equal to one another and a second total light quantity is the second total light quantity illustrated in FIG. 11.

FIG. 13 is a graph illustrating an output gradation value T2 when the input gradation values of the pixels P are equal to one another and the second total light quantity SR2 is the second total light quantity SR2 illustrated in FIG. 11. The vertical and horizontal axes illustrated in FIG. 13 are the same as those illustrated in FIG. 9.

The output gradation value T2 that is calculated by the first drive circuit 40 as described above increases and then decreases as the position shifts from the first side surface 10c side toward the second side surface 10d along the first direction W1.

With such a relation between the output gradation value T2 (FIG. 13) and the second total light quantity SR2 (FIG. 11), the luminance levels of the pixels P are made approximately equal to one another. In this case, "white" is displayed at almost the same brightness in the entire display area DA, and the desired display can be achieved. Thus, in the display device 1 including the display panel 10 onto which the light is incident from the two side surfaces (first side surface 10c and second side surface 10d) located opposite to each other, the luminance of the pixels P can be uniformized when the input gradation values corresponding to the pixels P are equal to one another.

Thus, in the present second embodiment, the first drive circuit 40 calculates the output gradation value for each of the pixels P based on the light quantity obtained by summing the first light quantity RA1 of the first light and the third light quantity RA3 of the third light at the pixel P and the input gradation value contained in the image signal.

While the preferred embodiments have been described above, the present disclosure is not limited to such embodiments. The content disclosed in the embodiments is merely an example, and can be variously modified within the scope not departing from the gist of the present disclosure. Any modifications appropriately made within the scope not departing from the gist of the present disclosure also naturally belong to the technical scope of the present disclosure.

For example, in the first embodiment, the light source device 20 may be located so as to face one of the fourth XL side surface 15c, the fourth XR side surface 15d, and the fourth YF side surface 15f of the second base member 15. The light source device 20 may be located on a lateral side of any one of the first substrate 11, the second substrate 12, and the first base member 14.

In the second embodiment, the third light quantity RA3 of the second light source device 160 at the pixel P at k=α may differ from the first light quantity RA1 of the light source device 20 at the pixel P at k=1.

Other operational advantages accruing from the aspects described in the embodiments above that are obvious or appropriately conceivable by those skilled in the art from the description in this specification will naturally be understood as accruing from the present disclosure.

What is claimed is:

1. A display device comprising:
   a display panel having a display area overlapping a plurality of pixels arranged in a matrix having a row-column configuration in plan view;
   a light source device that is located on a lateral side of the display panel and is configured to emit first light to a first side surface side of the display panel to cause the first light to travel toward a second side surface side opposite the first side surface;
   a reflective member that is located on the second side surface and configured to reflect the first light as second light from the second side surface side toward the first side surface side; and
   a drive circuit configured to calculate an output gradation value for each of the pixels based on a light quantity obtained by summing a first light quantity of the first light and a second light quantity of the second light at the pixel and an input gradation value contained in an image signal, and apply a voltage corresponding to the output gradation value to the pixel.

2. The display device according to claim 1, wherein the display panel comprises a liquid crystal layer containing polymer-dispersed liquid crystals.

3. The display device according to claim 1, wherein
   the pixels comprise two pixels arranged along a first direction from the first side surface toward the second side surface, and
   the drive circuit is configured to:
      calculate the first light quantity at a pixel on the second side surface side of the two pixels using a first light scattering degree caused by irradiation of elements included in the display panel by the first light at a pixel on the first side surface side of the two pixels; and
      calculate the second light quantity at the pixel on the first side surface side of the two pixels using a second light scattering degree caused by irradiation of the elements included in the display panel by the second light at the pixel on the second side surface side of the two pixels.

4. The display device according to claim 1, wherein
   the pixels comprise two pixels arranged along a first direction from the first side surface toward the second side surface, and
   the drive circuit is configured to:
      calculate the first light quantity at a pixel on the second side surface side of the two pixels using a third light scattering degree that changes based on the input gradation value at a pixel on the first side surface side of the two pixels; and
      calculate the second light quantity at the pixel on the first side surface side of the two pixels using a fourth light scattering degree that changes based on the input gradation value at the pixel on the second side surface side of the two pixels.

5. A display device comprising:
   a display panel having a display area overlapping a plurality of pixels arranged in a matrix having a row-column configuration in plan view;
   a light source device that is located on a lateral side of the display panel and is configured to emit first light to a first side surface side of the display panel to cause the first light to travel toward a second side surface side opposite the first side surface;
   a reflective member that is located on the second side surface side of the display panel and configured to reflect the first light toward the first side surface side; and
   a drive circuit configured to calculate an output gradation value for each of the pixels based on an input gradation value contained in an image signal, and apply a voltage corresponding to the output gradation value to the pixel, wherein
   the drive circuit is configured to, when the input gradation values corresponding to the pixels are equal to one another, increase and then reduce the output gradation values corresponding to the pixels arranged from the first side surface toward the second side surface along a first direction.

6. A display device comprising:
   a display panel having a display area overlapping a plurality of pixels arranged in a matrix having a row-column configuration in plan view;
   a light source device that is located on a lateral side of the display panel and is configured to emit first light to a first side surface side of the display panel to cause the first light to travel toward a second side surface side opposite the first side surface;
   a second light source device that is located on a lateral side of the display panel and is configured to emit third light to the second side surface side to cause the third light to travel toward the first side surface side; and
   a drive circuit configured to calculate an output gradation value for each of the pixels based on a light quantity obtained by summing a first light quantity of the first light and a third light quantity of the third light at the pixel and an input gradation value contained in an image signal, and apply a voltage corresponding to the output gradation value to the pixel.

* * * * *